Oct. 17, 1933.                M. HOLMDAHL                1,930,936
                SIGNALING DEVICE FOR AUTOMOTIVE VEHICLES
                    Filed Nov. 16, 1927        2 Sheets-Sheet 2
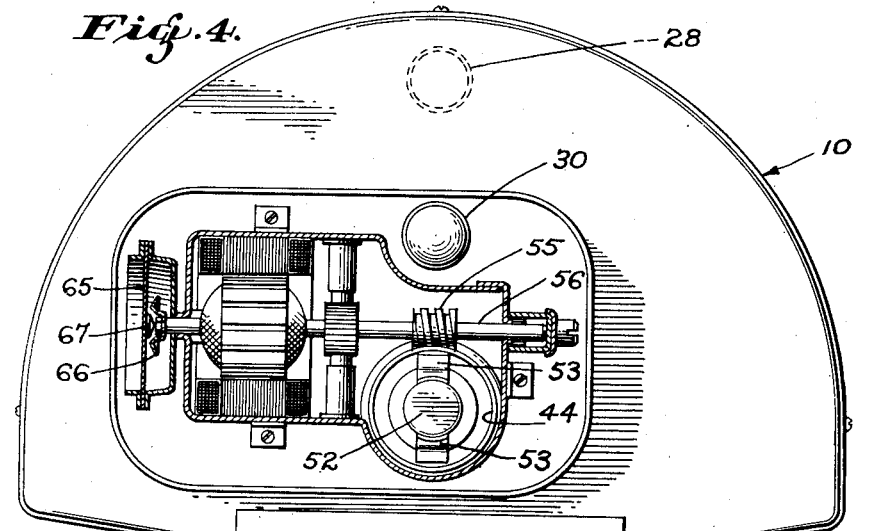
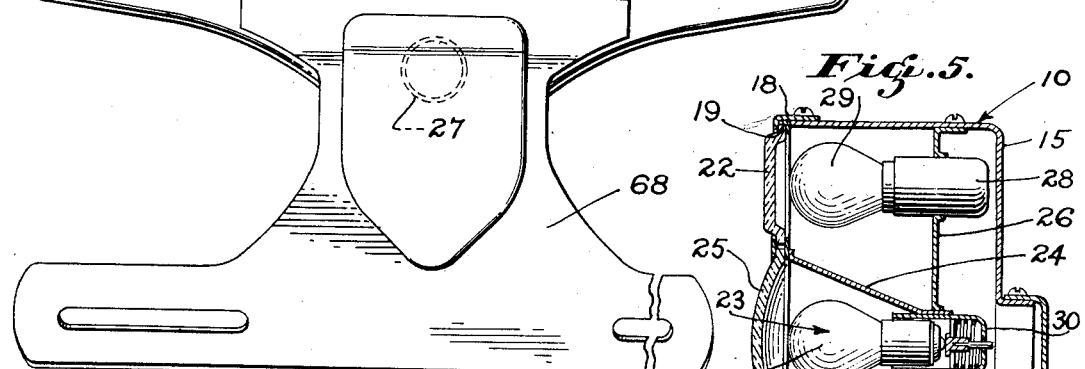
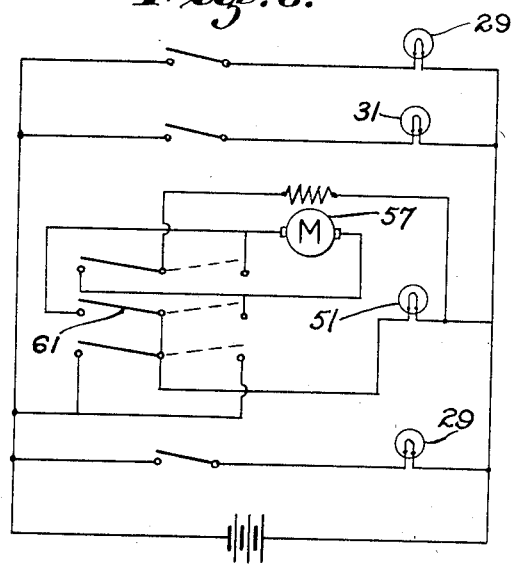
INVENTOR.
Monville Holmdahl.
BY
Townsend Loftus & Abbett
ATTORNEYS.

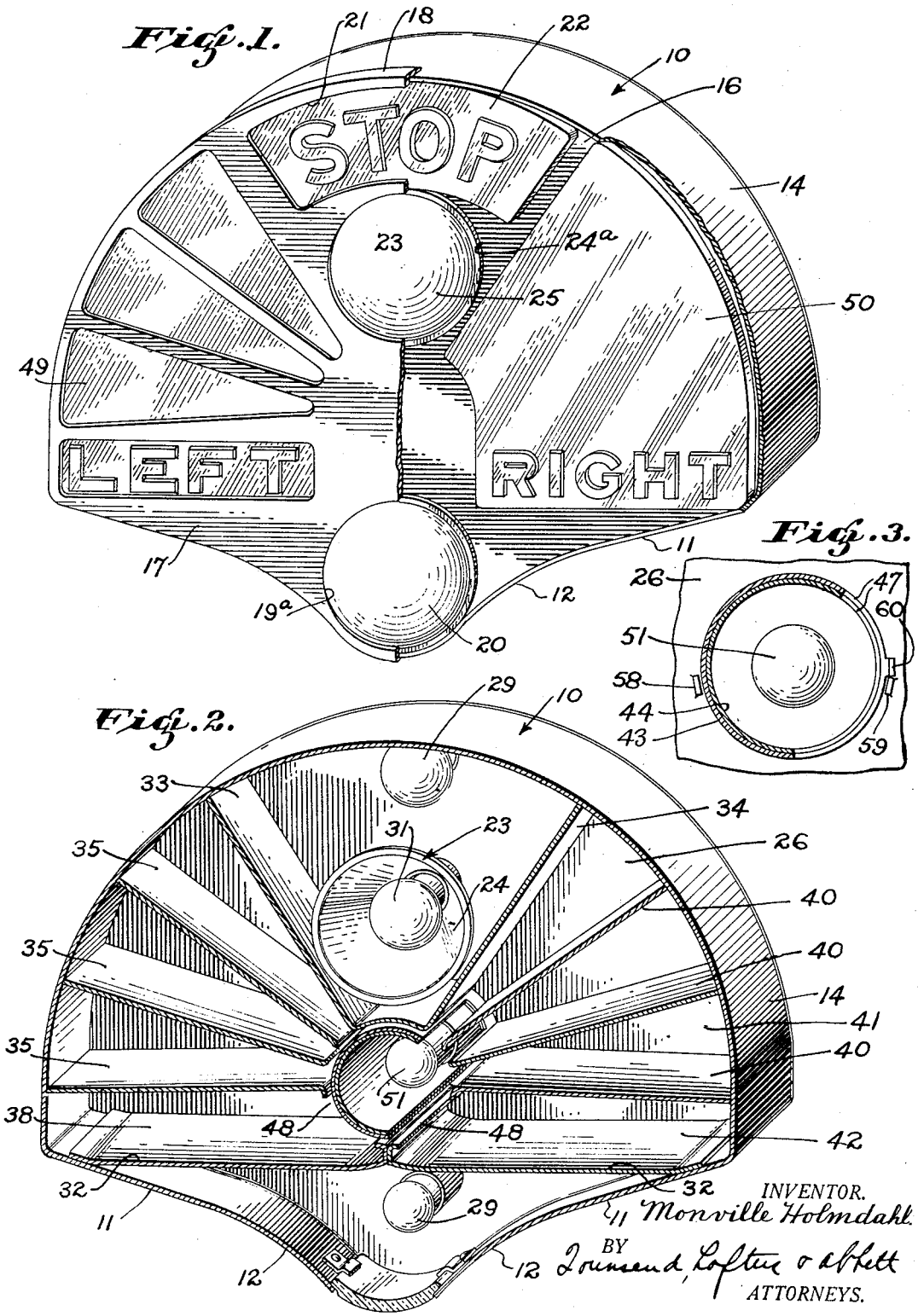

Patented Oct. 17, 1933

1,930,936

UNITED STATES PATENT OFFICE 1,930,936

SIGNALING DEVICE FOR AUTOMOTIVE VEHICLES

Monville Holmdahl, Oakland, Calif.

Application November 16, 1927
Serial No. 233,612

3 Claims. (Cl. 177—327)

This invention relates to automobile accessories and particularly pertains to a signaling device for motor vehicles such as disclosed in a prior application filed by me November 8, 1926, Serial #146892, patented March 22, 1932, Patent No. 1,850,999 and entitled "Signaling devices".

In this prior application referred to I disclosed a signaling device embodying sufficient signals in a single unit to fulfill all the requirements of complete signaling system for automotive vehicles.

It is the principal object of the present invention to generally improve and simplify the construction and operation of devices of the character referred to whereby to provide an attractive appearing signal for automotive vehicles which may be operated to effectively indicate the various maneuvers through which the vehicle may be put by its operator.

In carrying out the invention into practice I provide an attractive appearing casing which is intended to be positioned on a vehicle so that it will be visible to following vehicles. This casing is equipped with a tail light, rear headlight, and a stop light, all of which are fitted with remote controls of the usual type. The casing is also fitted with lights for indicating left and right turns which are operated in a manner to attract attention and indicate the intended course of travel of the vehicle. Cooperating with these latter lights is an audible signal to attract attention of those for whom the signaling is intended.

One form which the invention may assume is exemplified in the following description and illustrated by way of example in the accompanying drawings, in which Figure 1 is a perspective view of a signaling device embodying the preferred form of my invention with the face plate partially broken away to illustrate certain features of construction.

Figure 2 is a perspective view of the casing of the signaling device partially in section to more clearly disclose its construction.

Figure 3 is a fragmentary view in section of the means for illuminating the direction signals.

Figure 4 is a view in rear elevation of the casing with the cover plate removed.

Figure 5 is a view in central vertical section through the signaling device.

Figure 6 is a wiring diagram disclosing the manner in which the signal lights are electrically controlled.

Referring more particularly to the accompanying drawings 10 indicates a casing, the upper half of which is substantially semicircular in outline. The lower half of the casing includes bottom walls 11 converging toward the center of the device where they are joined by an arcuate portion 12. These bottom walls 11 and 12 are in reality portions of the side wall 14 of the device which completely circumscribes the casing and extends between a rear wall 15 and a front wall 16. In this particular instance the side wall 14 and the rear wall 15 are formed from a single sheet of material.

Arranged over the front wall 16 of the casing is a face plate 17 which is formed with a peripheral flange 18. This flange lies over the edge of the side wall 14 so that the face plate may be detachably secured to the casing by screws or other suitable fastening means.

Reference being had to Fig. 5 it will be seen that the front wall 16 is the same in contour and dimensions as the exterior perimeter of the casing and is interposed between the face plate 17 and the front edge of the side wall 14. Therefore, when the face plate 17 is secured to the casing the front wall 16 will be clamped in proper position.

The face plate and front wall are formed with aligned apertures constituting signaling means which are enclosed by transparent cover plates. These latter are secured between the face plate 17 and the front wall 16. To accommodate these cover plates the face plate 17 and front wall 16 are spaced apart by a protruding lip 19 formed at the perimeter of the front wall and against which the face plate abuts. This construction is illustrated in Fig. 5.

The signaling means above referred to includes a tail light opening 19 of circular form located concentric to the curved portion 12 and contiguous to the bottom of the casing and on its vertical center line. This opening is enclosed by a lens 20 preferably red in color and serves the function of the tail light for the vehicle upon which the casing is mounted.

Just below the tail light the bottom wall of the housing is formed with an aperture covered by transparent plate so that light rays emanating from the tail light bulb will be directed downwardly and will illuminate a license plate mounted beneath the casing.

Adjacent the top of the casing is an arcuate aperture 21 the inner and outer boundaries of which are concentric to the arcuate outline of the casing. The aperture 21 is formed on the vertical center line of the casing and its ends are formed on radial lines emanating from the center from which its curved boundaries were struck. The aperture 21 is enclosed by a red lens 22 upon which the word "Stop" or other similar legend is formed. It is intended that the aperture 21 and cooperating elements constitute a stop signal and that the illuminating means therefore be controlled by the brakes of the vehicle as in common practice. This latter forms no part of the present invention and is, therefore, not illustrated.

Directly beneath the "Stop" signal is a so-called rear headlight 23 for directing light rays rearwardly so that the driver may back the vehicle with safety at night. This rear headlight 23 comprises a conical reflector 24 secured interiorly of the casing with its axis at right angles to the plane of the face plate 17. The open end of the reflector abuts against the front wall 16 of the casing in alignment with circular apertures 24ª in the front wall 16 and face plate 17. These apertures 24ª are of the same diameter as the large end of the reflector and are enclosed by a transparent lens 25.

Intermediate the front and rear walls 15 and 16 of the casing is a partition 26. This partition is fitted with sockets 27 and 28 which are in alignment with the tail light and stop light lenses 20 and 22 and are fitted with incandescent bulbs 29 for illuminating these two signals. These sockets are properly electrically connected with the controls of both signals. That is, the tail light will be connected to the instrument board light control switch of the vehicle and the stop light will be connected with the switch controlled by the vehicle brakes.

Reference being had to Figure 5 it will be seen that the reduced end of the reflector 24 of the rear headlight 23 is secured in the partition 26. A socket 30 is secured in this reduced end of this reflector 24 and supports an incandescent bulb 31. When this bulb is illuminated its rays will be reflected outwardly by the reflector 24 and illuminate the roadway at the rear of the vehicle. The socket 30 is electrically connected with a source of current, preferably the battery of the car and is controlled by a switch which may be located if desired on the instrument board of the vehicle.

It will be noticed from Fig. 2 that the interior of the housing is divided into a plurality of different compartments by partition walls. That is, the lower portion of the housing wherein the tail light bulb is situated is separated from the remainder of the housing by partition walls 32 extending horizontally between the opposite sides of the housing. At the upper end of the casing the compartment wherein the "Stop" signal is disposed is separated from the remainder of the casing by radially arranged partitions 33 and 34 which are disposed at opposite sides of the vertical center of the casing. At the left side of the casing a plurality of partition walls 35 divide the space between the partition walls 32 and 33 into three segmental compartments of substantially equal dimensions and a rectangular compartment 38. At the opposite side of the housing the construction is substantially the same, due to the positioning of a plurality of radially disposed partitions 40 which divide the space between the partitions 34 and 32 into three segmentally shaped compartments 41 and a rectangular compartment 42. This latter, as shown in Fig. 2 is disposed on the same plane and directly opposite the rectangular compartment 38 at the left hand side of the casing.

The radial partition walls described emanate from a common center to the semicircular side wall 14 of the housing. Disposed concentrically about this center is a pair of cylinders 43 and 44. These cylinders are disposed one within the other and their contiguous surfaces are in frictional contact and they are guided for rotation in guides 45 and 46. It will be noticed from Fig. 5 that the cylinders 43 and 44 are disposed at right angles to the plane of the face plate and that they are interposed between the front and rear walls 15 and 16.

The inner cylinder 44 is slightly longer than the outer cylinder 43 so that the former will project rearwardly further than the latter.

Intermediate the partition wall 26 and the front wall 16 the cylinders 43 and 44 are formed with ports 47 of equal dimensions which may be brought into alignment by relative movement between the cylinders. These ports 47 are also disposed so that they may be aligned with openings 48 which occur between the inner ends of the radially disposed partition walls which divide the spaces between the partition 26 and the front wall 16 into two sets of segmental compartments. The set of compartments at the left of the casing comprises the left turn signal and the set of compartments at the right of the casing comprises the right turn signal.

The front wall 16 and the face plate 17 are formed with segmentally shaped apertures which are in alignment with the segmental compartments. Intermediate the face plate 17 and the front wall 16 of the casing, glass cover plates 49 and 50 are secured to cover the apertures. That is to say, one plate 49 is provided to cover all of the apertures of the left turn signal and one glass plate 50 is provided to cover all of the apertures of the right turn signal. As the face plate 17 is formed with a plurality of openings for each signal, when the device is assembled the left turn signal will have the appearance of four different apertures and the right turn signal will give the appearance of having four different apertures. The portions of the signal lenses 49 and 50 disposed over the compartments 38 and 42 are formed with legends to indicate which turn is contemplated. That is, the portion of glass plate 49 disposed over the compartment 38 is formed with the word "Left" and the portion of the plate 50 over the compartment 42 is formed with the word "Right".

It should be stated that it is intended that the glass plate covering the left turn signal be red in color while the glass plate of the right hand signal be green in color so that they may be clearly distinguished.

I intend that the signal be so operated that when the left hand turn is contemplated the various apertures of the left turn signal will be illuminated in rapid succession and when a right hand turn is contemplated that the segmental portions of the right turn signal be rapidly and successively illuminated. I accomplish this by mounting an incandescent bulb 51 within the cylinders 43 and 44. This bulb 51 is disposed in a socket 52 concentrically disposed within the cylinders 43 and 44. The socket 52 is secured in position by a pair of arms 53 attached at one end of the socket 52 and at the other to the guide 46 which rotatably supports the front end of the cylinders 43 and 44. It is intended that when the bulb 51 is illuminated that the port in the outer cylinder 43 be disposed in alignment with the openings between the inner ends of the radial partitions of one set of compartments and that the longer cylinder 44 be rotated to intermittedly dispose the port 47 therein in alignment with the port 47 in the cylinder 43 and thereby intermittedly and successively illuminating the group of compartments with which the port 47 in the cylinder 43 is aligned.

To operate the cylinders the longer end of the cylinder 44 is formed with worm gear teeth 54 which mesh with a worm 55 disposed on shaft 56 of a motor 57. This motor 57 is arranged and suitably supported at the rear of the casing. The motor 57 is of the reversible type so that the operator may operate either signal as desired.

Reference being had to Fig. 3 it will be noticed that a pair of stop lugs 58 and 59 are disposed on the partition wall 26 of the casing at opposite sides of the center of the cylinders. A stop lug 60 is formed on the outer cylinder 43 to engage these lugs 58 and 59. When the motor 57 is placed in operation and through the medium of the worm 55 and the gear teeth 54 on the cylinder 44 drives the cylinder 44 in an anti-clockwise direction the frictional engagement between the cylinders 44 and 43 will cause them both to move in an anti-clockwise direction in unison until the lug 60 engages the lug 58 preventing the cylinder 43 from further rotation. It will be apparent that the moment the lug 60 on the cylinder 43 engages the lug 58 on the casing, the port 47 in the cylinder 43 will be disposed in a position communicating with all of the compartments of the left turn signal. However, the longer cylinder 44 will continue to rotate and will intermittently place its port 47 in alignment with port 47 of cylinder 43, thus successively and intermittently illuminating the compartments of the left turn signal. This operation will be continued until the motor is stopped.

If it is desired to indicate a right turn the motor is started and caused to revolve in a direction revolving the cylinders 43 and 44 in a clockwise direction. Due to their frictional engagement the cylinders will move in a clockwise direction in unison until the lug 60 on the cylinder 43 engages the lug 59 on the casing. This engagement will align the port 47 in the cylinder 43 with the openings in the ends of the segmental compartments comprising the right turn signal. The longer cylinder 44 will continue revolving and intermittently dispose its port 47 in alignment with the port 47 in the cylinder 43 and thereby intermittently and successively illuminate the different compartments comprising the right turn signal.

It will be noticed that the signals will be illuminated from top to bottom in each case.

Reference being had to Fig. 6, where the wiring diagram of the various electrical control devices is shown, it will be noted that the motor 57 is controlled by a three pole double throw switch 61. While this switch 61 controls both the light 51 and the motor, the motor and light 51 are not in series. When the switch is at one side the left turn signal will be placed in operation and when the switch 61 is turned to the other side the right turn signal will be operated. The switch 61 may be disposed on either the steering column of the car or on the instrument board.

In the diagram in Fig. 6 I have also shown the circuits for the "Stop" light, rear headlight, and tail light. The circuit of each of these lights is controlled by a separate switch. That is, the rear headlight and tail light may be controlled by switches suitably disposed on the instrument board of the car and the switch of the "Stop" light or signal will be preferably controlled by the brake lever of the vehicle.

I intend to sound an audible alarm each time either the left or right turn signals are operated and I prefer that the audible alarm be a horn or similar device. Reference being had to Fig. 4 is will be seen that the motor frame supports a diaphragm 65 and that the motor shaft is fitted with a vibrator 66 adapted to vibrate the diaphragm by engagement with a button 67 on the diaphragm. The vibrator 66 and the button 67 are relatively excentric so that rotation of the vibrator 66 due to operation of the motor 57 will actuate the diaphragm and sound an alarm.

In operation of the device the casing is fitted with a bracket 68 by means of which it may be mounted at the rear of the vehicle with a face plate of the casing facing the rear. The bracket 68 is so constructed that it may be mounted on the license plate bracket as is sometimes done in standard practice. In this case the casing will be mounted directly above the license plate and when the tail light is lighted, light rays emanating from the tail light bulb 29 will pass through the aperture in the bottom of the casing and illuminate the license plate.

The tail light and the rear headlight may be electrically connected with a switch on the instrument board of the vehicle. Likewise, the "Stop" light is connected with a switch operated by the foot brake of the car. Therefore, the driver at his option may illuminate both the tail light and the rear headlight while the "Stop" light will be automatically illuminated each time the foot brake pedal is depressed.

When the driver of the vehicle contemplates making a left turn the switch 61 is closed to complete a circuit to the motor in the direction causing the cylinders 43 and 44 to be revolved in an anti-clockwise direction. This, as previously described will place the port 47 of the cylinder 43 in alignment with the open ends of the compartments comprising the left turn signal. Inner cylinder 44 will continue to revolve and intermittently and successively illuminate the different apertures comprising the left turn signal. As the motor 57 and the light bulb 51 are controlled by the same switch the moment that the motor circuit is closed the circuit through the light 51 will also be closed.

After negotiating the left turn the operator opens the switch 61 disrupting the circuit of motor 57 and the light 51.

When the driver desires to negotiate a right turn the switch 61 is closed with its opposite contacts and the motor revolves in a direction opposite to that which it revolves when signaling a left turn. This, as previously described, revolves the cylinders 43 and 44 in a clockwise direction and disposes the port 47 of the cylinder 43 in alignment with the open ends of the compartments which comprise the right turn signal. After this position has been assumed continued revolution of the cylinder 44 will cause the light emitting apertures of the right turn signal to be intermittently and successively illuminated. After negotiating the right turn the driver may again open the switch 61 to break the circuit of the motor 57 and light 51.

Each time the left and right direction signals are operated an audible alarm will be sounded to attract the attention of motorists following the car upon which my signal is mounted.

From the foregoing it is obvious that the direction signals of the present device will be both audible and visible and that the successive and intermittent illumination of the signals will attract the attention of motorists following the car. Therefore, the signal will be very effective in operation.

I also desire to point out that I have provided a complete signaling system for an automobile in a single casing which is attractive in appearance so that it will not detract from the appearance of an automobile. It is also desired to point out that the signal here disclosed is of simple construction and may be inexpensively manufactured. While I have shown the preferred form of my invention it is to be understood that various changes in its construction may be made without departing from the spirit of the invention as defined in the appended claims.

Having thus described my invention, what I claim and desire to secure by Letters Patent is:

1. A signaling device comprising a casing having a left and a right signal arranged in the same plane, each signal comprising a set of radial compartments having light emitting apertures and open at their inner ends, a single source of illumination arranged centrally with respect to the open inner ends of the compartments, means for controlling the successive illumination of said compartments comprising a plurality of concentric tubular rotary shutters having openings adapted to be brought into register with the open inner ends of the said compartments, and motor means operatively connected with one shutter for continuously rotating the same in either direction during a desired signal period, said device also including means for causing the other shutter to move into registry with one or the other set of compartments in accordance with the direction of movement of the first named shutter.

2. A signaling device comprising a casing having a left and a right signal, each signal comprising a set of radial compartments having light emitting apertures and open at their inner ends, a source of illumination adjacent the inner ends of the compartments, concentrically disposed rotary shutters disposed between the source of illumination and the open ends of the compartments and having openings adapted to be brought into register with said open ends, means for continuously rotating one shutter in either direction during a desired signal period, means including first mentioned means for moving another shutter into registry with one or the other set of compartments in accordance with the direction of movement of the first named shutter and means for limiting the rotation of the last named shutter whereby it will be held in registry with one or the other sets of compartments.

3. In a signaling device of the character described, a casing, a left and a right signal each comprising radially arranged compartments having light emitting apertures and an open end, a source of light positioned to direct light into the open end of either signal, a pair of cylindrical concentric rotary shutters surrounding the source of light and having openings adapted to be brought into register with the open end of either signal, means for rotating one of said shutters in either direction, the other shutter frictionally engaging said first named shutter, and means for limiting movement of the second named shutter whereby, upon operation of said rotating means in either direction, the opening in the second shutter will register with the open end of one of the signals and the opening in the first shutter will intermittently register with the same.

MONVILLE HOLMDAHL.